(12) United States Patent
Wheeler

(10) Patent No.: US 9,230,245 B1
(45) Date of Patent: Jan. 5, 2016

(54) DELIVERABILITY-BASED E-MAIL SENDING

(75) Inventor: Christopher A. Wheeler, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 152 days.

(21) Appl. No.: 13/529,313

(22) Filed: Jun. 21, 2012

(51) Int. Cl.
*G06F 15/16* (2006.01)
*G06Q 10/10* (2012.01)
*G06Q 50/00* (2012.01)

(52) U.S. Cl.
CPC .............. *G06Q 10/107* (2013.01); *G06Q 50/01* (2013.01)

(58) Field of Classification Search
CPC .... G06Q 10/107; H04L 12/585; H04L 12/58; H04L 12/581; H04L 12/5855
USPC .......................... 709/201–206, 217–219, 232
See application file for complete search history.

(56) References Cited

U.S. PATENT DOCUMENTS

| | | | |
|---|---|---|---|
| 6,609,156 B1 * | 8/2003 | Magolan et al. ............. | 709/232 |
| 6,643,687 B1 * | 11/2003 | Dickie et al. ................. | 709/206 |
| 6,847,994 B1 * | 1/2005 | Akimoto et al. .............. | 709/223 |
| 6,957,248 B2 * | 10/2005 | Quine et al. ................... | 709/206 |
| 7,093,025 B1 * | 8/2006 | Gupta ............................ | 709/239 |
| 7,490,128 B1 * | 2/2009 | White et al. ................... | 709/206 |
| 7,617,284 B2 | 11/2009 | Salamuniccar | |
| 7,996,475 B2 * | 8/2011 | Drako et al. .................. | 709/206 |
| 8,032,592 B2 | 10/2011 | Campise et al. | |
| 8,095,612 B2 | 1/2012 | Cowan et al. | |
| 8,224,902 B1 * | 7/2012 | Glasser et al. ................ | 709/206 |
| 8,566,401 B1 | 10/2013 | Hernacki et al. | |
| 8,572,188 B1 | 10/2013 | Hartmann | |
| 2003/0018722 A1 * | 1/2003 | Almeda et al. ............... | 709/206 |
| 2005/0055409 A1 | 3/2005 | Alsarraf et al. | |
| 2008/0172466 A1 * | 7/2008 | Tonegawa et al. ............ | 709/206 |
| 2008/0288601 A1 * | 11/2008 | Keohane et al. .............. | 709/206 |
| 2008/0320093 A1 | 12/2008 | Thorne | |
| 2009/0006572 A1 * | 1/2009 | Fuisz ............................. | 709/206 |
| 2009/0204676 A1 | 8/2009 | Parkinson et al. | |
| 2009/0240780 A1 * | 9/2009 | Brown et al. ................. | 709/206 |
| 2009/0282108 A1 | 11/2009 | Sachtjen et al. | |
| 2011/0219083 A1 * | 9/2011 | Nishi ............................ | 709/206 |
| 2011/0258218 A1 | 10/2011 | Hayes et al. | |
| 2011/0289162 A1 | 11/2011 | Furlong et al. | |
| 2012/0158867 A1 | 6/2012 | Levow | |
| 2012/0179761 A1 * | 7/2012 | Fuhrmann ..................... | 709/206 |

(Continued)

OTHER PUBLICATIONS

"RFC 5321—Simple Mail Transfer Protocol", J. Klensin, The Internet Society, Oct. 2008. Source: http://tools.ietf.org/html/rfc2821, pp. 1-96.
U.S. Appl. No. 13/529,338, filed Jun. 21, 2012, Christopher A. Wheeler.

*Primary Examiner* — Liangche A Wang
*Assistant Examiner* — Melaku Habtemariam
(74) *Attorney, Agent, or Firm* — Robert C. Kowert; Meyertons, Hood, Kivlin, Kowert & Goetzel, P.C.

(57) ABSTRACT

Methods and systems for deliverability-based e-mail sending are disclosed. A plurality of e-mail addresses for a user are acquired. For each of the e-mail addresses, a connection between a sending computer system and a receiving computer system is opened. A likelihood of successful e-mail delivery is determined for each of the connections. The connection having the highest likelihood of delivery is automatically selected. An e-mail is sent using the selected connection, and the other connections are closed without sending an e-mail.

27 Claims, 11 Drawing Sheets

(56) References Cited

U.S. PATENT DOCUMENTS

| | | | |
|---|---|---|---|
| 2012/0253897 A1* | 10/2012 | Killoran et al. ............. 705/14.4 |
| 2013/0080914 A1 | 3/2013 | Souza et al. |
| 2013/0166657 A1 | 6/2013 | Tadayon |
| 2013/0246537 A1 | 9/2013 | Gaddala |

* cited by examiner

DELIVERABILITY-BASED E-MAIL SENDING

BACKGROUND

Most e-mail traffic involves one sender (i.e., the address specified in the From field) and one recipient (i.e., the address specified in the To field). In some cases, multiple recipients are specified using the To, Cc, and/or Bcc fields. Generally speaking, however, bulk or transactional e-mail is sent on a one-to-one basis for the sake of deliverability (i.e., the likelihood of the recipient's ISP to deliver the e-mail) as well as the recipient's privacy.

Typically, a sending application composes the content for an e-mail and passes the content to an agent called a mail transport agent (MTA). The MTA on the sender's side calls the recipient's domain as specified in the recipient's e-mail address. The sending MTA connects to the receiving MTA sitting behind the recipient's domain and then pushes the message across the connection. If the message cannot be delivered, a bounce may be generated. In response to the bounce, the sending MTA may retry or give up.

Message delivery may fail for a variety of reasons. The recipient's e-mail address may be abandoned by its user, reclaimed by its host (e.g., due to prolonged inactivity), canceled by its user (e.g., along with cancelation of service with the host), or otherwise deactivated for any number of potential reasons. The host of the recipient's domain may be temporarily inaccessible due to network problems or problems with hardware and/or software at the host's e-mail servers. In some cases, delivery may be significantly delayed by the host (e.g., for hours or days) due to transient problems or host policies.

Online merchants typically maintain only one e-mail address for each customer account. Therefore, if a message sent by the merchant bounces back, the merchant may have no other way to contact the customer electronically. For the many reasons discussed above, the message may not be available to the customer at the e-mail address associated with the customer's account within a reasonable amount of time after the message has been sent by the merchant. Some types of messages, such as advertisements or solicitations, may not be time-critical for the customer. However, detrimental consequences may follow if other types of messages, such as order confirmations, are not received promptly by the customer.

Accordingly, it is desirable for senders of e-mail (e.g., merchants) to have reliable techniques for contacting recipients (e.g., customers).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for sending one or more e-mails to a plurality of candidate recipients are described. A sender such as an online merchant may acquire a plurality of different e-mails for a particular user (e.g., a customer). In one embodiment, the sender may send an e-mail only to the e-mail address having the highest likelihood of successful delivery. In another embodiment, the sender may send an e-mail to individual ones of the e-mail addresses in sequence until one of the e-mails is successfully delivered.

Figure 1:
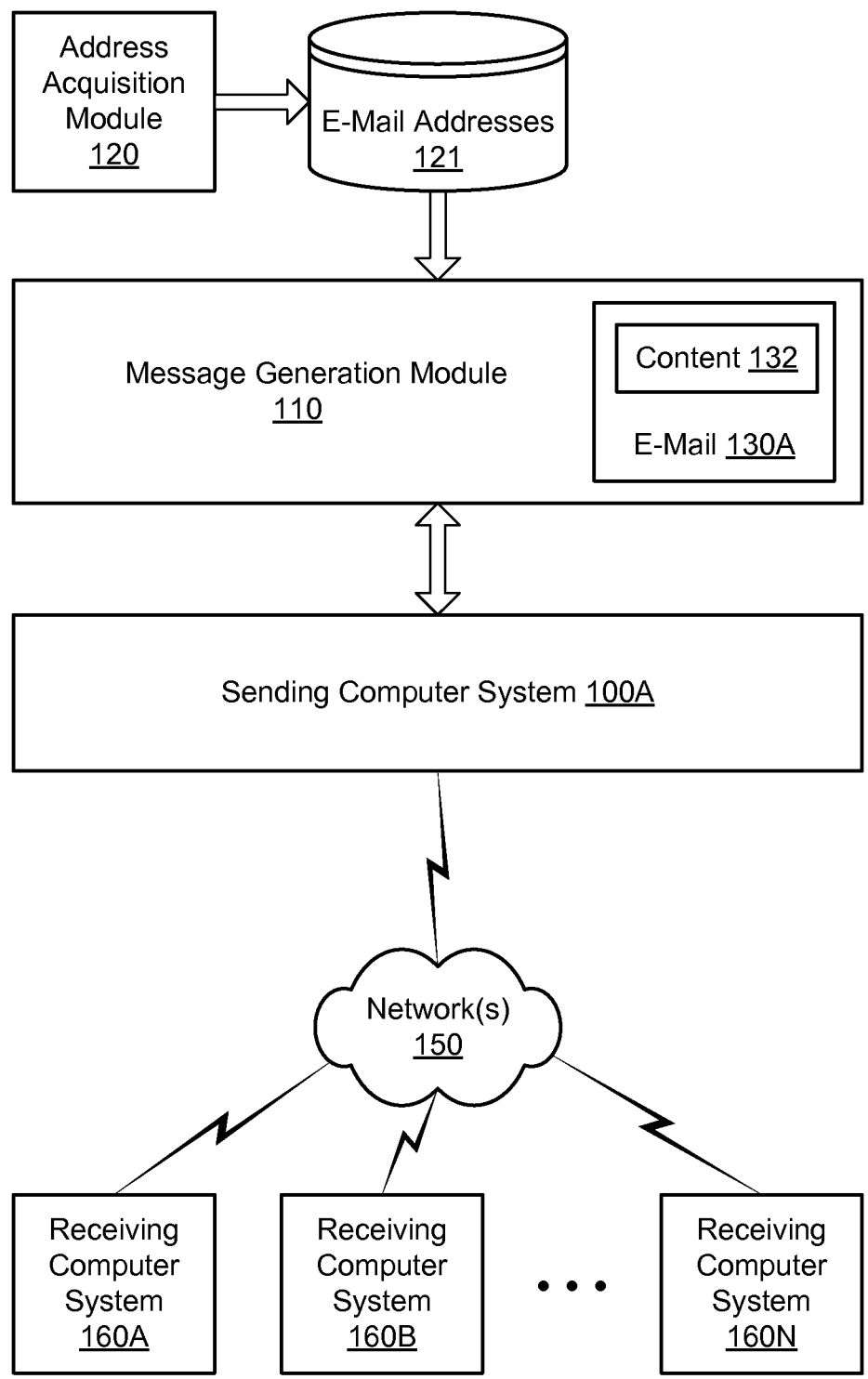
FIG. 1 illustrates an example system environment for sending one or more e-mails to a plurality of candidate recipients, according to one embodiment.

FIG. 1 illustrates an example system environment for sending one or more e-mails to a plurality of candidate recipients, according to one embodiment. The example computing environment may comprise an address acquisition module 120, a message generation module 110, and a sending computer system 100A. The sending computer system 100A may comprise one or more computing devices, any of which may be implemented by the example computing device 3000 illustrated in FIG. 11. In various embodiments, the functionality of the different modules (e.g., address acquisition module 120 and message generation module 110) may be provided by the same computing device or by different computing devices, including the sending computer system 100A and/or one or more other computer systems.

Using the address acquisition module 120, multiple e-mail addresses 121 for a particular user may be acquired and stored. In one embodiment, each of the e-mail addresses 121 may be associated with the same customer account at an online merchant. Any suitable technique may be used to obtain the e-mail addresses 121. For example, the customer may be asked to enter multiple e-mail addresses in a web interface associated with the customer's account with an online merchant. The e-mail addresses may be solicited from the customer through a popup in the checkout process, through a reminder when the customer logs in, and/or by allowing customers to provide new addresses via their account settings. In one embodiment, the customer may designate one of the e-mail addresses as a primary address and one or more other e-mail addresses as alternate addresses. The different e-mail addresses 121 may typically belong to different domains, but some of the e-mail addresses 121 may belong to the same domain.

The message generation module 110 may generate e-mails such as e-mail 130A. E-mail 130A may include a header and message content (i.e., a body) 132. The header may include one or more of the e-mail addresses 121. The sending computer system 100A may be in communication with a plurality of potential receiving computer systems 160A, 160B, 160N over one or more networks 150 (e.g., the internet). Each of the receiving computer systems 160A, 160B, 160N may correspond to an e-mail server or host for the domain of one of the e-mail addresses 121. Although three receiving computer systems 160A, 160B, 160N are shown for purposes of illustration, it is contemplated that the sending computer system 100A may be in communication with any suitable number of receiving computer systems.

Figure 2:
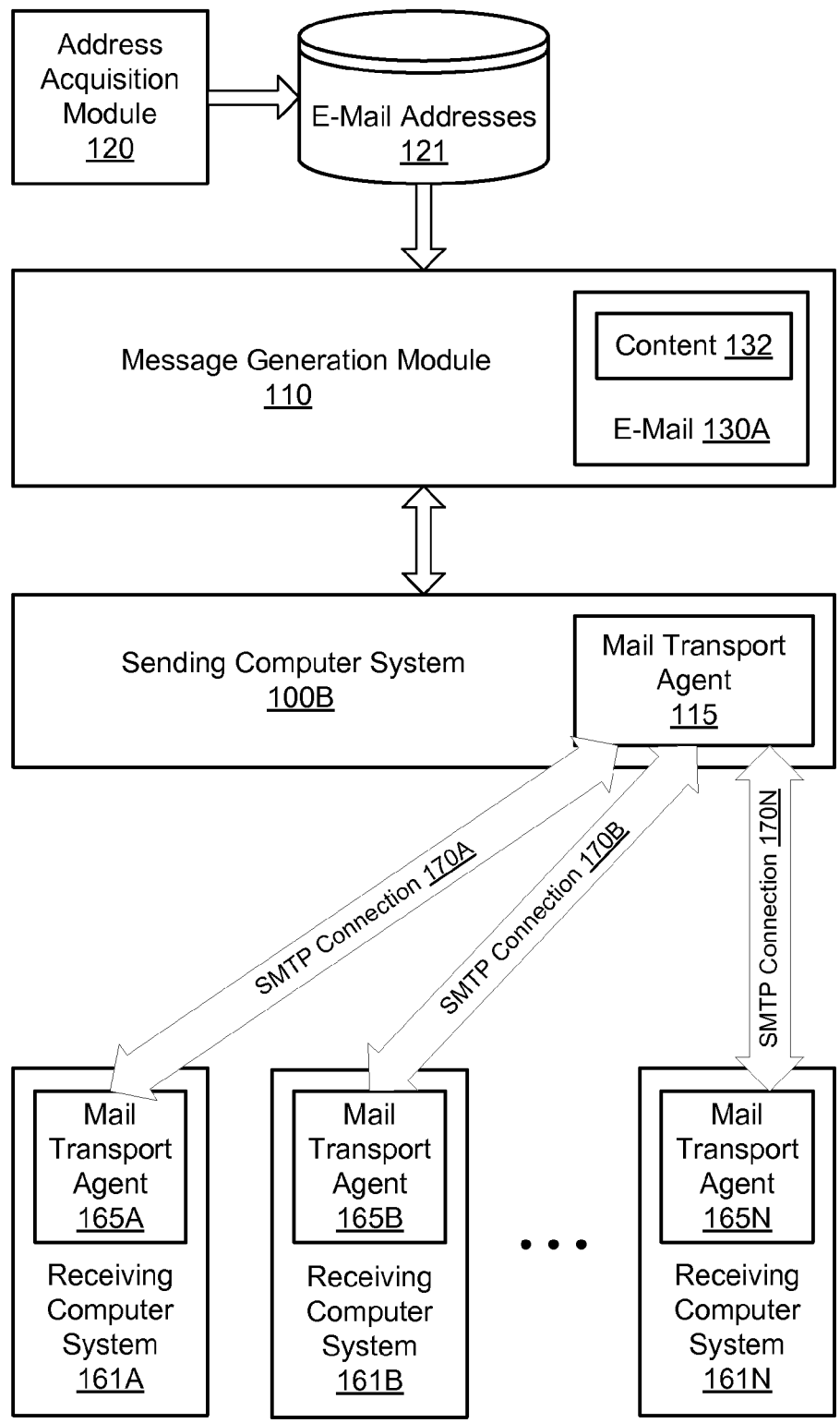
FIG. 2 illustrates further aspects of an example system environment for sending one or more e-mails to a plurality of candidate recipients, according to one embodiment.

FIG. 2 illustrates further aspects of an example system environment for sending one or more e-mails to a plurality of candidate recipients, according to one embodiment. A sending computer system 100B may comprise one or more computing devices, any of which may be implemented by the example computing device 3000 illustrated in FIG. 11. The sending computer system 100B may include a mail transport agent (MTA) 115 that handles communications with recipient computer systems. The MTA 115 may also be referred to as a message transfer agent, a mail transfer agent, or a message transport agent. To send an e-mail, the sending MTA 115 may open an SMTP (Simple Mail Transfer Protocol) connection with a corresponding MTA on another computer system. For example, the sending MTA 115 may open a first SMTP connection 170A with a first MTA 165A on a first receiving computer system 161A, a second SMTP connection 170B with a second MTA 165B on a second receiving computer system 161B, and an nth SMTP connection 170N with an nth MTA 165N on an nth receiving computer system 161N. In one embodiment, multiple SMTP connections such as the illustrated connections 170A, 170B, 170N may all be open simultaneously.

Deliverability-Based E-Mail Sending

Figure 3:
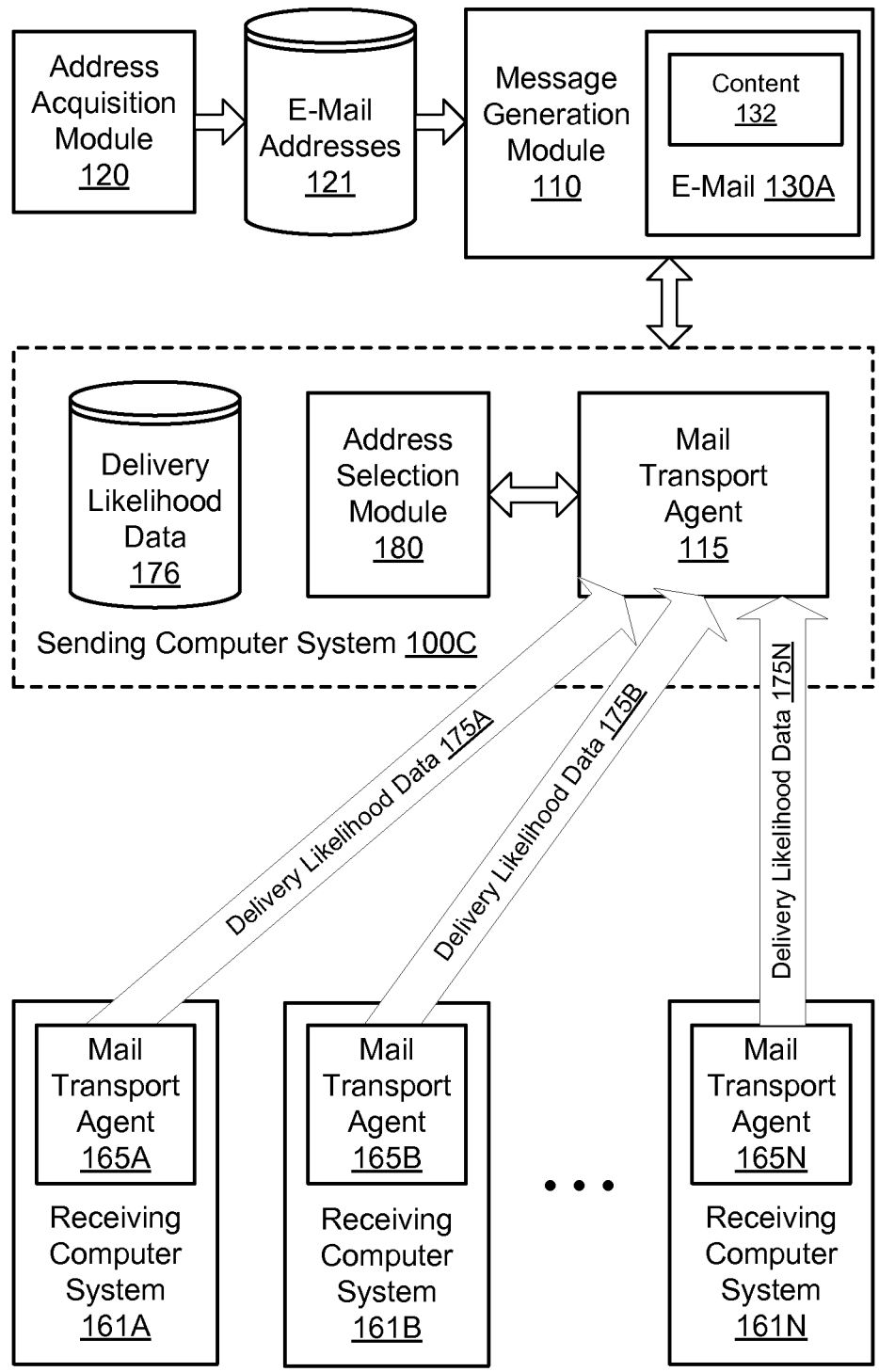
FIG. 3 illustrates an example system environment for deliverability-based e-mail sending, according to one embodiment.

FIG. 3 illustrates an example system environment for deliverability-based e-mail sending, according to one embodiment. A sending computer system 100C may comprise one or more computing devices, any of which may be implemented by the example computing device 3000 illustrated in FIG. 11. As discussed with reference to FIG. 2, multiple SMTP connections 170A, 170B, 170N may be simultaneously opened by the sending MTA 115 with multiple recipient MTAs 165A, 165B, 165N. A sending computer system 100C may assess the likelihood of successful e-mail delivery for each of the open connections. Using the gathered delivery likelihood data 176, an address selection module 180 may select one of the open connections (and its associated recipient e-mail address) for sending the e-mail 130A. The delivery likelihood data 176 may also be referred to as deliverability data or deliverability information.

Once the various SMTP connections 170A, 170B, 170N have been initiated or opened, the sending computer system 100C may obtain data indicative of the likelihood of e-mail delivery for each of the connections. The delivery likelihood data 175A, 175B, 175N may be obtained from each SMTP connection. In one embodiment, the delivery likelihood data 175A, 175B, 175N may be obtained while the various SMTP connections 170A, 170B, 170N are simultaneously open. In one embodiment, the delivery likelihood data 175A, 175B, 175N may be stored by the sending computer system 100C as delivery likelihood data 176. It is contemplated that the delivery likelihood data may comprise different elements or combinations of elements.

To obtain the delivery likelihood data 175A, 175B, 175N, the MTA 115 may attempt to send two initial commands associated with sending an e-mail: a first "hello" command (i.e., an acknowledgement that a connection is made), followed by an RCPT command (i.e., providing the address of the recipient to the recipient's e-mail server). The MTA 115 may then listen for a response, if any, from each receiving computer system. For example, a recipient server may not respond at all, may respond positively within a relatively short or long amount of time (i.e., RCPT OK), or may claim that the address is invalid. Based on the quality of the responses and/or the quality of the connection, the address selection module 180 may determine which SMTP connection (and associated e-mail address) has the highest likelihood of delivering the message.

In one embodiment, the delivery likelihood data may comprise data indicating the success or failure of the opening of the connection between the sending MTA and the respective receiving MTA. For example, if the connection cannot be opened or is immediately closed by the recipient MTA (e.g., SMTP server response code 421 is received by the sending MTA), then the likelihood of successful e-mail delivery for the corresponding e-mail address may be given a low rank for deliverability among the e-mail addresses. In one embodiment, the delivery likelihood data may comprise a reply code to an RCPT command sent from the sending MTA to the respective receiving MTA. For example, a reply code indicating that the recipient is invalid, unavailable, or cannot be verified (e.g., SMTP code 252) may result in a low rank. However, a reply code to the RCPT command indicating that the requested action is OK (e.g., SMTP code 250) may result in a higher rank.

In one embodiment, the delivery likelihood data may comprise a response time to an RCPT command sent from the sending MTA to the respective receiving MTA. Faster response times may result in a higher rank for deliverability than slower response times. In one embodiment, the delivery likelihood data may comprise any other measurement of latency in the SMTP connection.

The address selection module 180 may implement any suitable algorithm or logic for assessing the delivery likelihood data 176 to select one of the e-mail addresses 121. In one embodiment, the address selection module 180 may comprise a rules engine that measures different vectors. For example, a failed connection or a closed connection may disqualify the corresponding e-mail address. Similarly, a failure of the receiving MTA to acknowledge the validity of the recipient's e-mail address (e.g., in response to an RCPT command) may disqualify the corresponding e-mail address. Among the open connections for which the RCPT command results in an OK or acknowledgement of validity, the connections (and their corresponding e-mail addresses) may be ranked according to their response times or latency. Accordingly, the verified e-mail address with the fastest open connection may typically be selected. If two or more connections are equally fast or otherwise tied in the deliverability ranking, any suitable tie-breaker may be used to select one of them.

In one embodiment, additional elements of the delivery likelihood data 176 may be obtained from sources other than the recipient MTAs via the simultaneously opened connections. In one embodiment, information that is collected regarding the customer's receipt or viewing of previously sent e-mails may be used to score the deliverability of the customer's e-mail addresses. This information may be referred to as engagement metrics. For example, if the customer clicks on a link or an image within an e-mail, and clicking of the link or image results in the use of a server associated with the online merchant, then that information may be used to score the deliverability of the e-mail address. In one embodiment, an invisible tracking pixel may be included in an e-mail; when the e-mail is opened, the pixel is rendered, and the opening of the e-mail may be communicated to a server associated with the merchant. This information may be deemed to increase the likelihood of a message being delivered to that address in the future. As a further example, if a message from the merchant is marked by the customer as unsolicited e-mail or spam, the customer's ISP may communicate the complaint to the merchant. The spam information may be used to lower the likelihood of delivery to the e-mail address or to skip the e-mail address when sending a message in the future.

Figure 4:
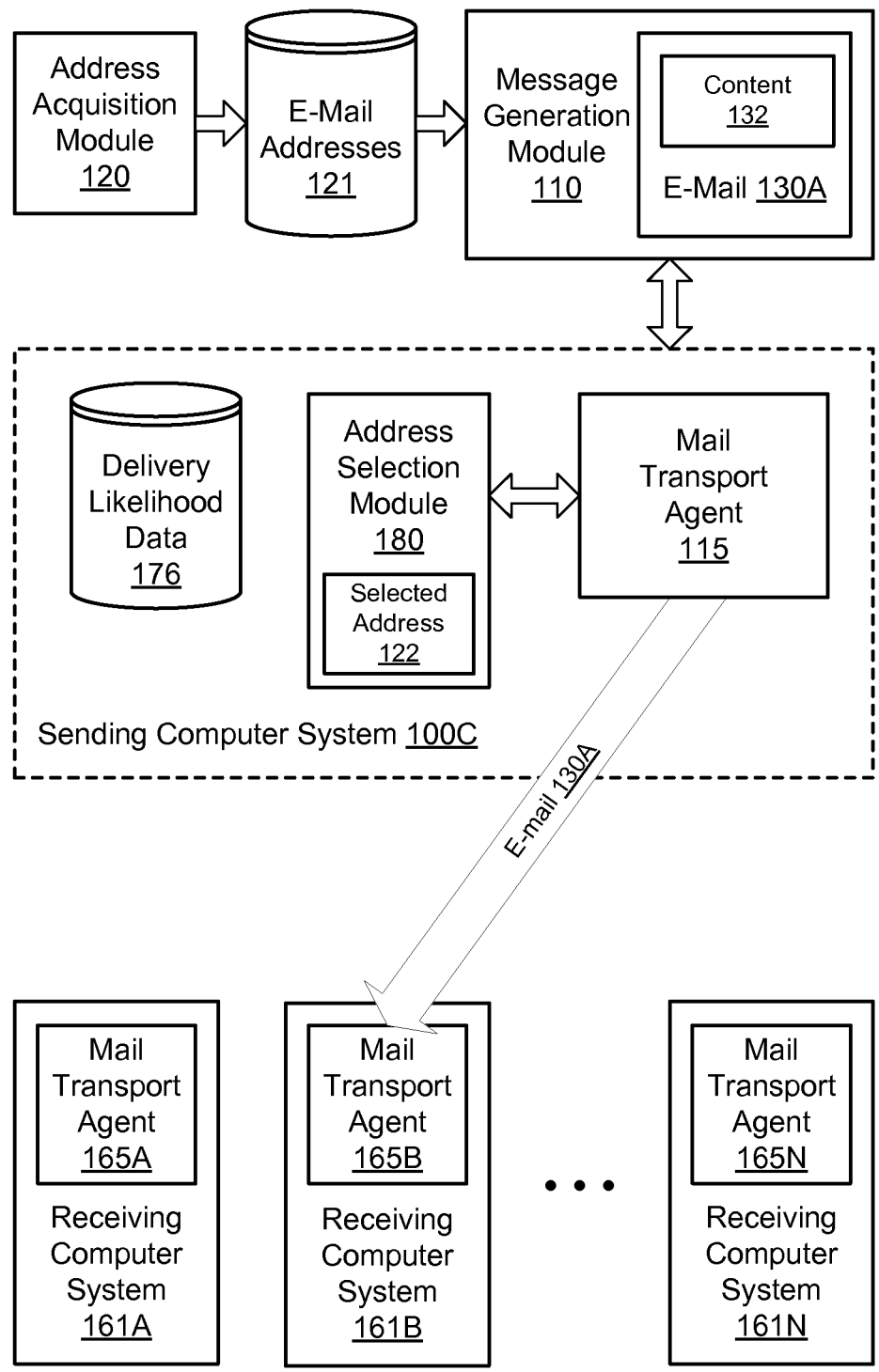
FIG. 4 illustrates further aspects of an example system environment for deliverability-based e-mail sending, according to one embodiment.

FIG. 4 illustrates further aspects of an example system environment for deliverability-based e-mail sending, according to one embodiment. As discussed above, the address selection module 180 may select an e-mail address 122 for the user based on the delivery likelihood data 176. In one embodiment, the sending computer system 100C may modify the header of the e-mail 130A to include the selected address 122. The sending MTA 115 may then push the e-mail 130A across the SMTP connection to the MTA of the receiving computer system associated with the selected e-mail address 122. As shown in the example of FIG. 4, the selected e-mail address corresponds to the receiving computer system 161B, which receives the e-mail 130A using MTA 165B via the SMTP connection 170B. In one embodiment, the MTA 115 may close the other SMTP connections (e.g., connections 170A and 170N) without sending an e-mail using those connections.

As discussed above with respect to FIGS. 3 and 4, the delivery-based e-mail sending methods and systems may select the recipient e-mail address and the receiving computer system based on deliverability data. In one embodiment, the delivery-based e-mail sending methods and systems may also select the sending computer system from a pool of such computer systems. The sending computer system may be associated with one or more IP (Internet Protocol) addresses. In this embodiment, the delivery likelihood data 176 may include data regarding individual computer systems in the pool of sending computer systems. For example, the delivery likelihood data 176 may include the fact that the IP address identifying a particular sending computer system has been blocked by one or more of the receiving computer systems 161A, 161B, 161N. In such circumstances, the blocked system(s) (and any associated IP addresses) may be ranked below the system(s) that have not been blocked in choosing the system from which to send the e-mail. In selecting one of the sending computer systems from the pool, techniques for load balancing may also be employed. The load balancing techniques may attempt to maximize the collective processor, memory, and/or network resources of the pool of sending computer systems.

In the examples of FIGS. 3 and 4, the address selection module 180 is illustrated as being separate from the MTA 115. In an alternate embodiment, a custom MTA may implement the functionality of the address selection module 180. In this alternate embodiment, another component such as the message generation module 110 may send a list of e-mail addresses to the custom MTA (e.g., using a suitable Application Programming Interface [API] call). The custom MTA may then open the various SMTP connections simultaneously, gather and assess the delivery likelihood data, select the most deliverable e-mail address, close the other connections, and send the e-mail to the selected address using the corresponding connection.

Figure 5:
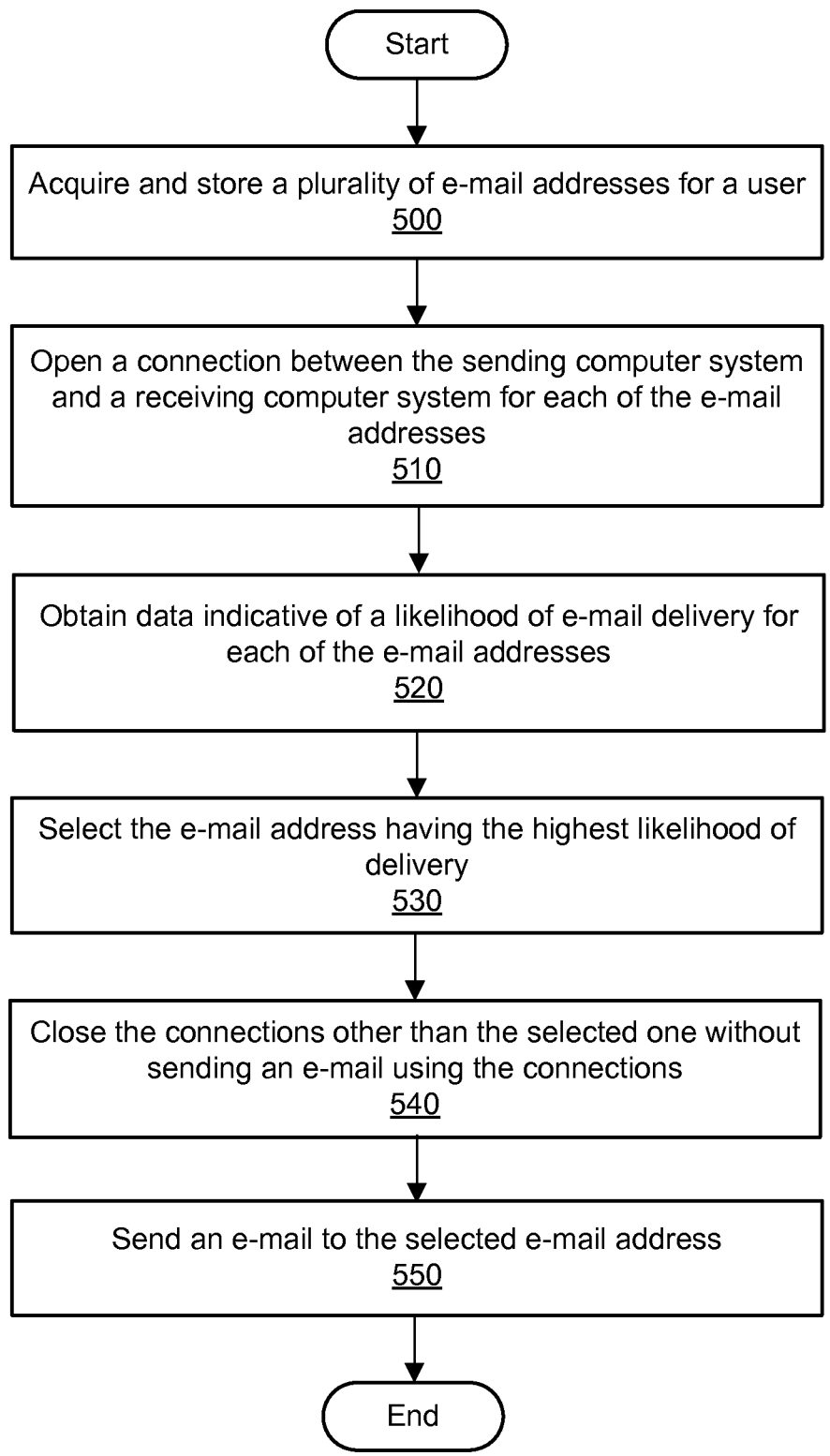
FIG. 5 is a flowchart illustrating a method for deliverability-based e-mail sending, according to one embodiment.

FIG. 5 is a flowchart illustrating a method for deliverability-based e-mail sending, according to one embodiment. As shown in 500, a plurality of e-mail addresses may be acquired and stored. The plurality of e-mail addresses may belong to a single user. For example, each of the plurality of e-mail addresses may be associated with the same customer account at an online merchant. As shown in FIGS. 1-3, the e-mail addresses may be acquired using an address acquisition module 120 and stored in a suitable database or storage 121.

A sending computer system (e.g., associated with an online merchant) may desire to send an e-mail to a user (e.g., a customer). In one embodiment, a message generation module may generate message content for an e-mail. The plurality of e-mail addresses for the user may be retrieved from storage. As shown in 510, a connection may be opened between the sending computer system and the receiving computer system for each of the e-mail addresses. In one embodiment, a connection may be opened between the sending MTA of the sending computer system and the receiving MTA for the receiving computer system for each of the e-mail addresses. The connection may comprise an SMTP connection.

As shown in 520, data indicative of a likelihood of e-mail delivery may be obtained for each of the e-mail addresses (i.e., for each of the connections). As discussed above with respect to FIGS. 3 and 4, the delivery likelihood data may be obtained from any suitable source, including but not limited to: the success or failure of the opening of the connections with the various receiving computer systems, response times for commands sent using the open connections (e.g., RCPT commands), reply codes to commands sent using the open connections (e.g., RCPT commands), previous indications of deliverability for individual e-mail addresses, and global data regarding the deliverability for various e-mail domains. Any suitable algorithm or logic may be used to assign values or weights to elements of the likelihood data in order to rank the e-mail addresses. As shown in 530, the e-mail address (i.e., the corresponding connection) having the highest likelihood of e-mail delivery may be selected for sending the e-mail.

As shown in 540, the connection between the sending computer system and the receiving computer system may be closed for each of the e-mail addresses other than the selected e-mail address. The other connections may be closed without sending an e-mail to the corresponding e-mail addresses. As shown in 550, an e-mail comprising the message content may be sent to the selected e-mail address. In one embodiment, the e-mail may be sent using the previously opened connection. In another embodiment, the previously opened connection may be closed along with the other connections, and another connection (e.g., an SMTP connection) may be opened for sending the e-mail to the selected e-mail address.

Round-Robin E-Mail Scheduling

Figure 6:
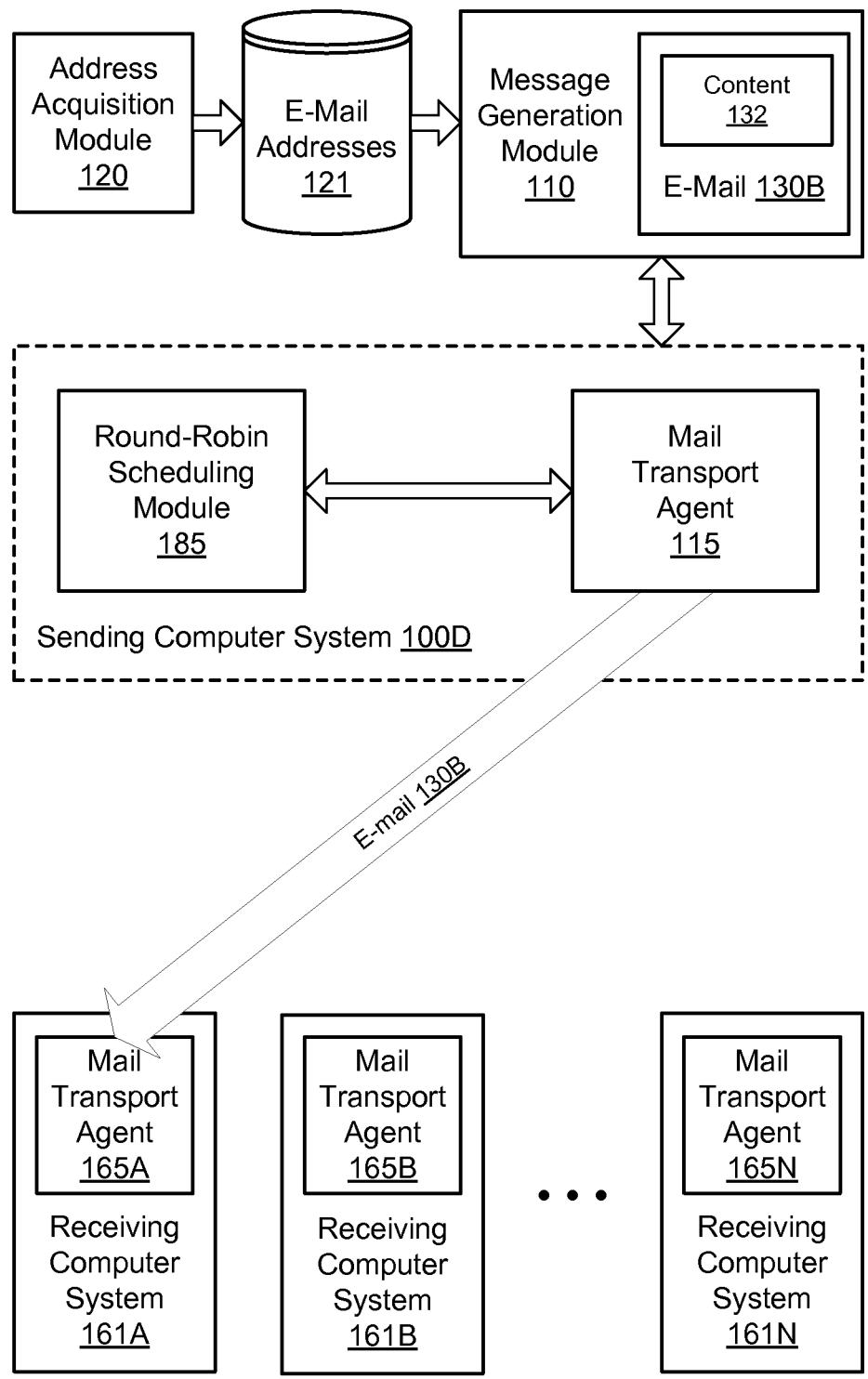
FIG. 6 illustrates an example system environment for round-robin e-mail scheduling, according to one embodiment.

FIG. 6 illustrates an example system environment for round-robin e-mail scheduling, according to one embodiment. A sending computer system 100D may comprise one or more computing devices, any of which may be implemented by the example computing device 3000 illustrated in FIG. 11. The sending computer system 100D may include a round-robin scheduling module 185 and a sending MTA 115. For a list of e-mail addresses 121 associated with a user, the round-robin scheduling module 185 may automatically try each address until a message is successfully delivered to one of the addresses. The SMTP connections with the various receiving MTAs may be opened in sequence, not in parallel.

In one embodiment, the addresses 121 may be tried in a random (i.e., pseudo-random) order. In one embodiment, the addresses 121 may be tried in a particular pre-determined order. For example, the list of addresses 121 may be ordered based on a priority specified by a user, such as a designation of a primary address and one or more alternate addresses. In one embodiment, the list of addresses 121 may be ordered by estimated deliverability (i.e., likelihood of delivery). The deliverability estimates may be based on one or more previous attempts to send a message to a plurality of the user's addresses, e.g., using the deliverability-based e-mail sending methods and systems illustrated in FIGS. 3-5. The deliverability estimates may also be based on attempts to send e-mails to a plurality of users. In this regard, data regarding e-mail domains across multiple customer accounts may be mined to generate global deliverability data. For example, if one particular domain is tending to be unavailable for recent attempts across multiple customer accounts, then that domain may be lowered in the round-robin order.

In one embodiment, the sending computer system 100D may modify the header of a first e-mail 130B to include the first address. The sending MTA 115 may then push the e-mail 130B across the SMTP connection to the MTA of the receiving computer system associated with the first e-mail address. As shown in the example of FIG. 6, the first e-mail address corresponds to the receiving computer system 161A, which receives the e-mail 130B using MTA 165A. If the first e-mail 130B is successfully delivered to the receiving computer system 161A, then the round-robin scheduling module 185 may discontinue any further attempts to send the message content 132 of the e-mail 130B to the user.

Figure 7:
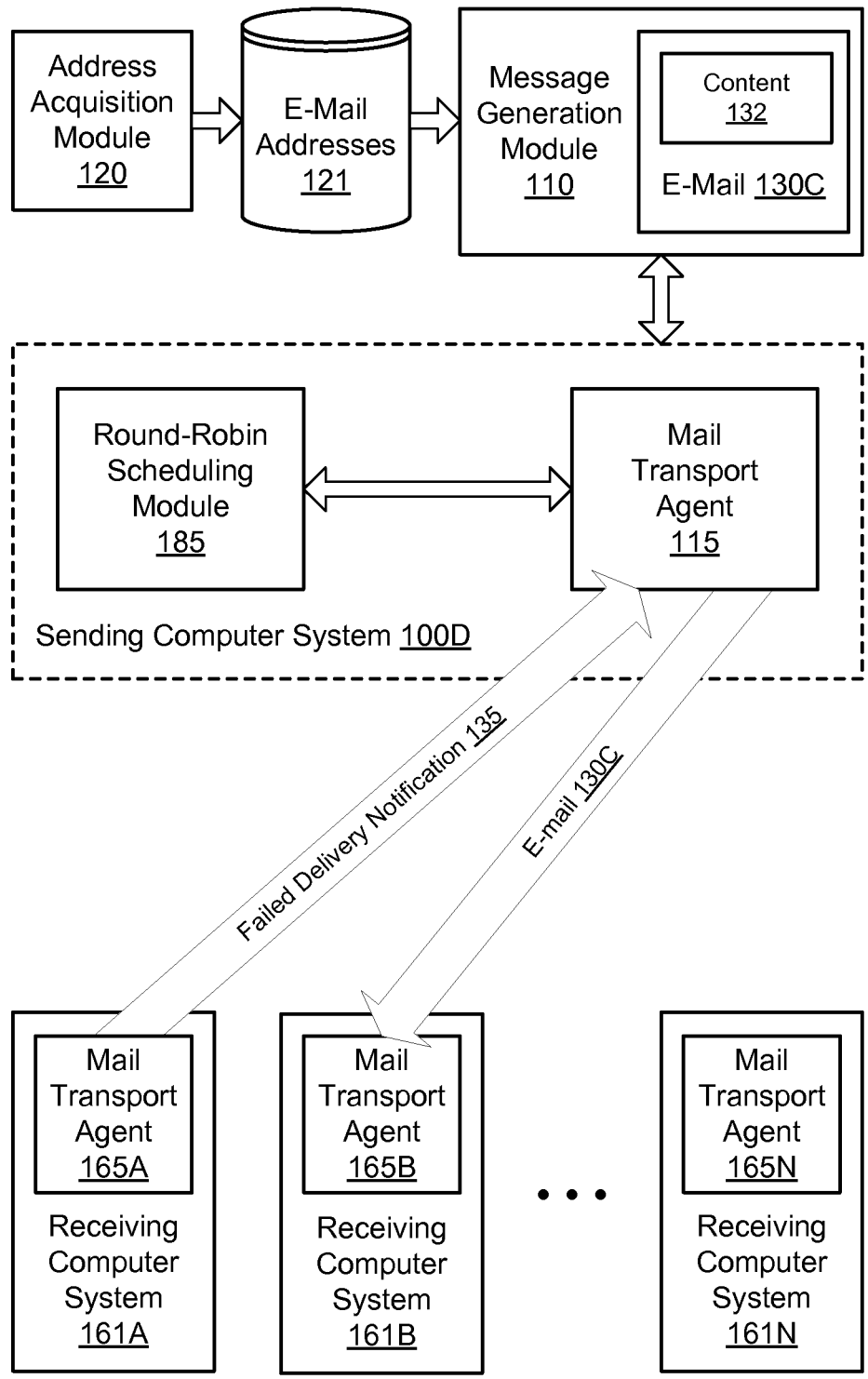
FIG. 7 illustrates further aspects of an example system environment for round-robin e-mail scheduling, according to one embodiment.

FIG. 7 illustrates further aspects of an example system environment for round-robin e-mail scheduling, according to one embodiment. Upon sending the first e-mail 130B to the first e-mail address, the e-mail may bounce. In this instance, a failed delivery notification 135 may be sent from the receiving MTA 165A to the sending MTA 115. The delivery failure may be due to any number of causes, including but not limited to: an invalid domain, an inaccessible host server, an invalid username at the domain, a locked or inaccessible user mailbox, etc. The sending computer system 100D may use any suitable technique(s) for assessing the success or failure of the delivery of the first e-mail 130B. The failed delivery notification 135 may be received through the same SMTP connection that was used to send the e-mail 130B. Alternatively, the failed delivery notification 135 may be received outside of the original SMTP connection. For example, if the mail transport agent 165A initially accepts the e-mail 130B but later rejects it before delivery to the user mailbox, then the sending computer system 100D may receive a hard bounce via an e-mail generated by the receiving computer system 161A. An e-mail indicating a hard bounce may indicate that the original e-mail is permanently undeliverable to the indicated address.

In response to the delivery failure of the first e-mail 130B, the round-robin scheduling module 185 may automatically instruct the MTA 115 to attempt to send a second e-mail 130C to another of the user's e-mail addresses. The sending computer system 100D may modify the header of a second e-mail 130C to include the second address. The sending MTA 115 may then push the e-mail 130C across the SMTP connection to the MTA of the receiving computer system associated with the second e-mail address. As shown in the example of FIG. 7, the second e-mail address corresponds to the receiving computer system 161B, which receives the e-mail 130C using MTA 165B. In this manner, the round-robin scheduling module 185 may keep sending the e-mails to the user's addresses in sequence until one of the e-mails is successfully delivered or until the list of e-mail addresses is exhausted.

In the examples of FIGS. 6 and 7, the round-robin scheduling module 185 is illustrated as being separate from the MTA 115. For each e-mail sent to each receiving computer system, the round-robin scheduling module 185 may send a separate instruction to the MTA 115, where each instruction specifies only one of the e-mail addresses. In an alternate embodiment, however, a custom MTA may implement the functionality of the round-robin scheduling module 185. In this alternate embodiment, another component such as the message generation module 110 may send a list of e-mail addresses to the custom MTA (e.g., using a suitable API call). The custom MTA may then send the e-mail each of the supplied addresses in sequence until a successful delivery is achieved. In one embodiment, a custom MTA may implement both the deliverability-based e-mail sending functionality (e.g., as illustrated in FIGS. 3-5) and the round-robin e-mail scheduling functionality (e.g., as illustrated in FIGS. 6-9).

Figure 8:
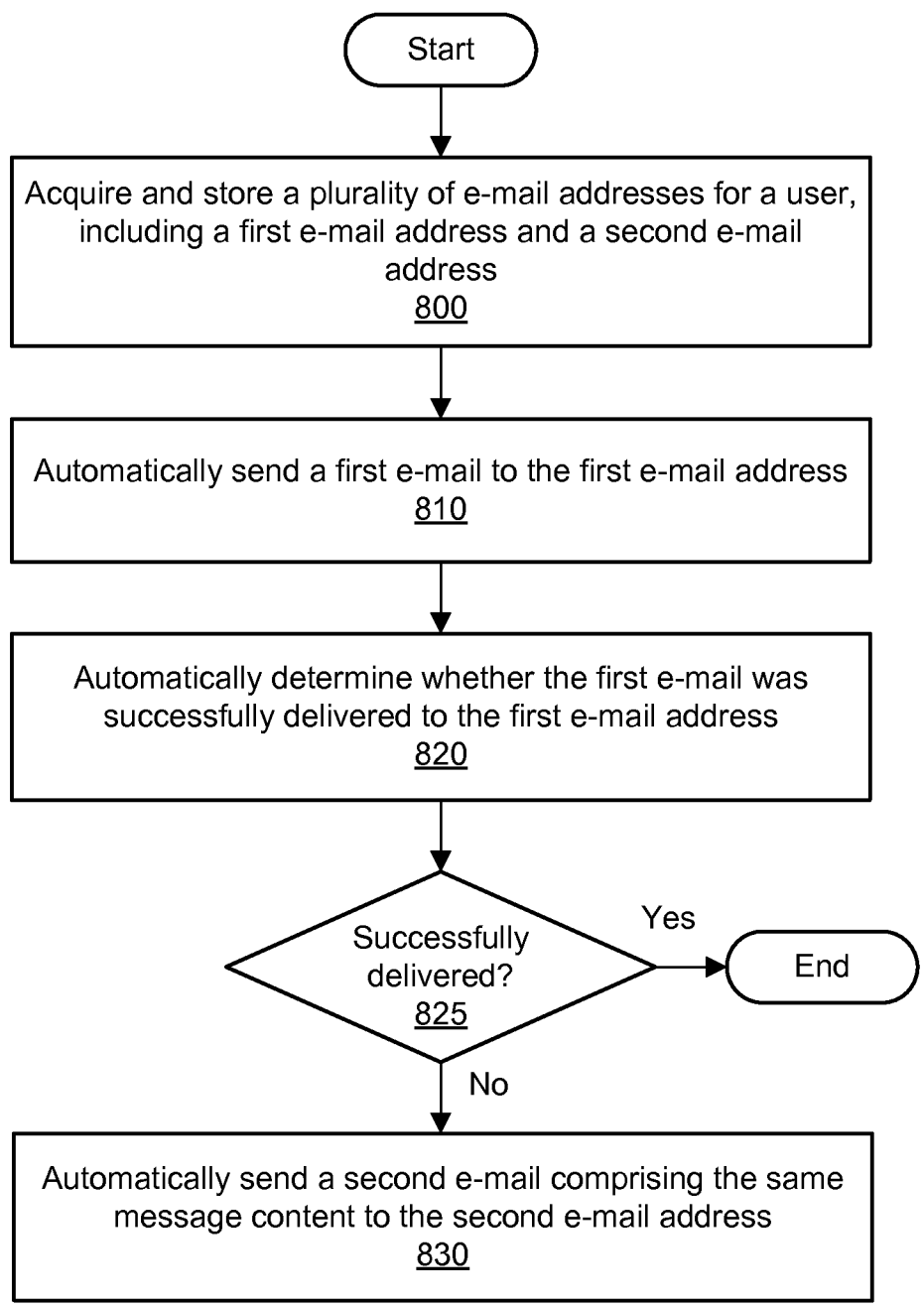
FIG. 8 is a flowchart illustrating a method for round-robin e-mail scheduling, according to one embodiment.

FIG. 8 is a flowchart illustrating a method for round-robin e-mail scheduling, according to one embodiment. As shown in 800, a plurality of e-mail addresses may be acquired and stored. The plurality of e-mail addresses may belong to a single user. For example, each of the plurality of e-mail addresses may be associated with the same customer account at an online merchant. As shown in FIGS. 6-7, the e-mail addresses may be acquired using an address acquisition module 120 and stored in a suitable database or storage 121. The plurality of e-mail addresses may comprise at least a first e-mail address and a second e-mail address.

A sending computer system (e.g., associated with an online merchant) may seek to send an e-mail to a user (e.g., a customer). In one embodiment, a message generation module may generate message content for an e-mail. The plurality of e-mail addresses for the user may be retrieved from storage. The first e-mail address for the user may be selected for sending a first e-mail. The first e-mail address may be selected from among the plurality of e-mail addresses using any suitable technique, such as selecting the first e-mail address at random or selecting the first e-mail address based on previously obtained deliverability data for individual addresses and/or domains (e.g., data 176 as shown in FIGS. 3-4).

As shown in 810, a first e-mail comprising the message content may be sent to the first e-mail address. The first e-mail may be sent automatically in response to deciding to contact the user and/or in response to selecting the first e-mail address for the user. In one embodiment, the first e-mail may be sent using an SMTP connection between the sending computer system and a receiving computer system associated with the domain of the first e-mail address. In one embodiment, a connection may be opened between the sending MTA of the sending computer system and the receiving MTA for the receiving computer system for the first e-mail address.

As shown in 820, the sending computer system may automatically determine whether the first e-mail was successfully delivered to the first e-mail address. In one embodiment, the sending computer system may determine successful delivery or failed delivery based on receipt of an SMTP response indicating successful delivery or failed delivery (i.e., a bounce) from the receiving computer system. As shown in 825, if the first e-mail was successfully delivered, then the process may end with no further e-mails being sent to the same user with the same message content.

However, if the first e-mail was not successfully delivered, then as shown in 830, the sending computer system may automatically send a second e-mail comprising the same message content to the second e-mail address. The second e-mail address may be selected from among the plurality of e-mail addresses using any suitable technique, such as selecting the second e-mail address at random or selecting the second e-mail address based on previously obtained deliverability data for individual addresses and/or domains (e.g., data 176 as shown in FIGS. 3-4). In one embodiment, the second e-mail may be sent using an SMTP connection between the sending computer system and a receiving computer system associated with the domain of the second e-mail address. In one embodiment, a connection may be opened between the sending MTA of the sending computer system and the receiving MTA for the receiving computer system for the second e-mail address.

In one embodiment, the sending computer system may continue to send e-mails in sequence to individual e-mail addresses associated with the user until one of the e-mails is successfully delivered or until all of the e-mail addresses have been exhausted without a successful delivery. For example, the sending computer system may automatically determine whether the second e-mail was successfully delivered to the second e-mail address. If the second e-mail was not successfully delivered to the second e-mail address, the sending computer system may automatically send a third e-mail comprising the message content to the third e-mail address.

Figure 9:
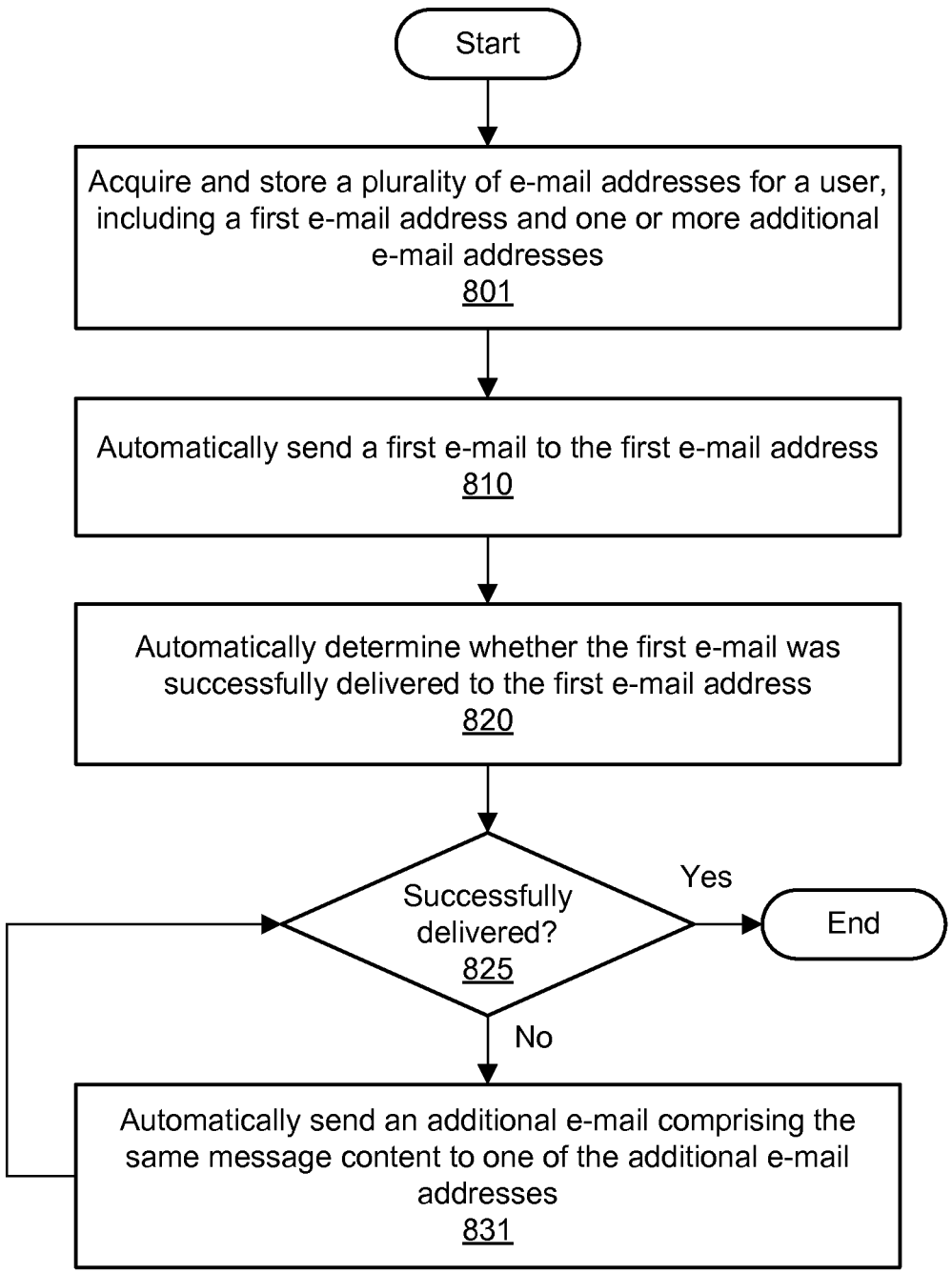
FIG. 9 is a flowchart illustrating a method for round-robin e-mail scheduling, according to one embodiment.

FIG. 9 is a flowchart illustrating another embodiment of a method for round-robin e-mail scheduling. As shown in 801, a plurality of e-mail addresses may be acquired and stored. The plurality of e-mail addresses may belong to a single user. For example, each of the plurality of e-mail addresses may be associated with the same customer account at an online merchant. As shown in FIGS. 6-7, the e-mail addresses may be acquired using an address acquisition module 120 and stored in a suitable database or storage 121. The plurality of e-mail addresses may comprise at least a first e-mail address and one or more additional e-mail addresses.

A sending computer system (e.g., associated with an online merchant) may seek to send an e-mail to a user (e.g., a customer). In one embodiment, a message generation module may generate message content for an e-mail. The plurality of e-mail addresses for the user may be retrieved from storage. The first e-mail address for the user may be selected for sending a first e-mail. The first e-mail address may be selected from among the plurality of e-mail addresses using any suitable technique, such as selecting the first e-mail address at random or selecting the first e-mail address based on previously obtained deliverability data for individual addresses and/or domains (e.g., data 176 as shown in FIGS. 3-4).

As shown in 810, a first e-mail comprising the message content may be sent to the first e-mail address. The first e-mail may be sent automatically in response to deciding to contact the user and/or in response to selecting the first e-mail address for the user. In one embodiment, the first e-mail may be sent using an SMTP connection between the sending computer system and a receiving computer system associated with the domain of the first e-mail address. In one embodiment, a connection may be opened between the sending MTA of the sending computer system and the receiving MTA for the receiving computer system for the first e-mail address.

As shown in 820, the sending computer system may automatically determine whether the first e-mail was successfully delivered to the first e-mail address. In one embodiment, the sending computer system may determine successful delivery or failed delivery based on receipt of an SMTP response indicating successful delivery or failed delivery (i.e., a bounce) from the receiving computer system. As shown in 825, if the first e-mail was successfully delivered, then the process may end with no further e-mails being sent to the same user with the same message content.

However, if the first e-mail was not successfully delivered, then as shown in 831, the sending computer system may automatically send an additional e-mail comprising the same message content to one of the additional e-mail addresses. The additional e-mail address may be selected from among the plurality of additional e-mail addresses using any suitable technique, such as selecting the additional e-mail address at random or selecting the additional e-mail address based on previously obtained deliverability data for individual addresses and/or domains (e.g., data 176 as shown in FIGS. 3-4). In one embodiment, the additional e-mail may be sent using an SMTP connection between the sending computer system and a receiving computer system associated with the domain of the additional e-mail address. In one embodiment, a connection may be opened between the sending MTA of the sending computer system and the receiving MTA for the receiving computer system for the additional e-mail address.

If the additional e-mail was not successfully delivered, then the sending computer system may send yet another e-mail to yet another of the additional e-mail addresses. In this manner, the sending computer system may continue to send e-mails in sequence to individual ones of the additional e-mail addresses until one of the e-mails is successfully delivered or until all of the additional e-mail addresses have been exhausted without a successful delivery.

Order Confirmation Page

Figure 10:
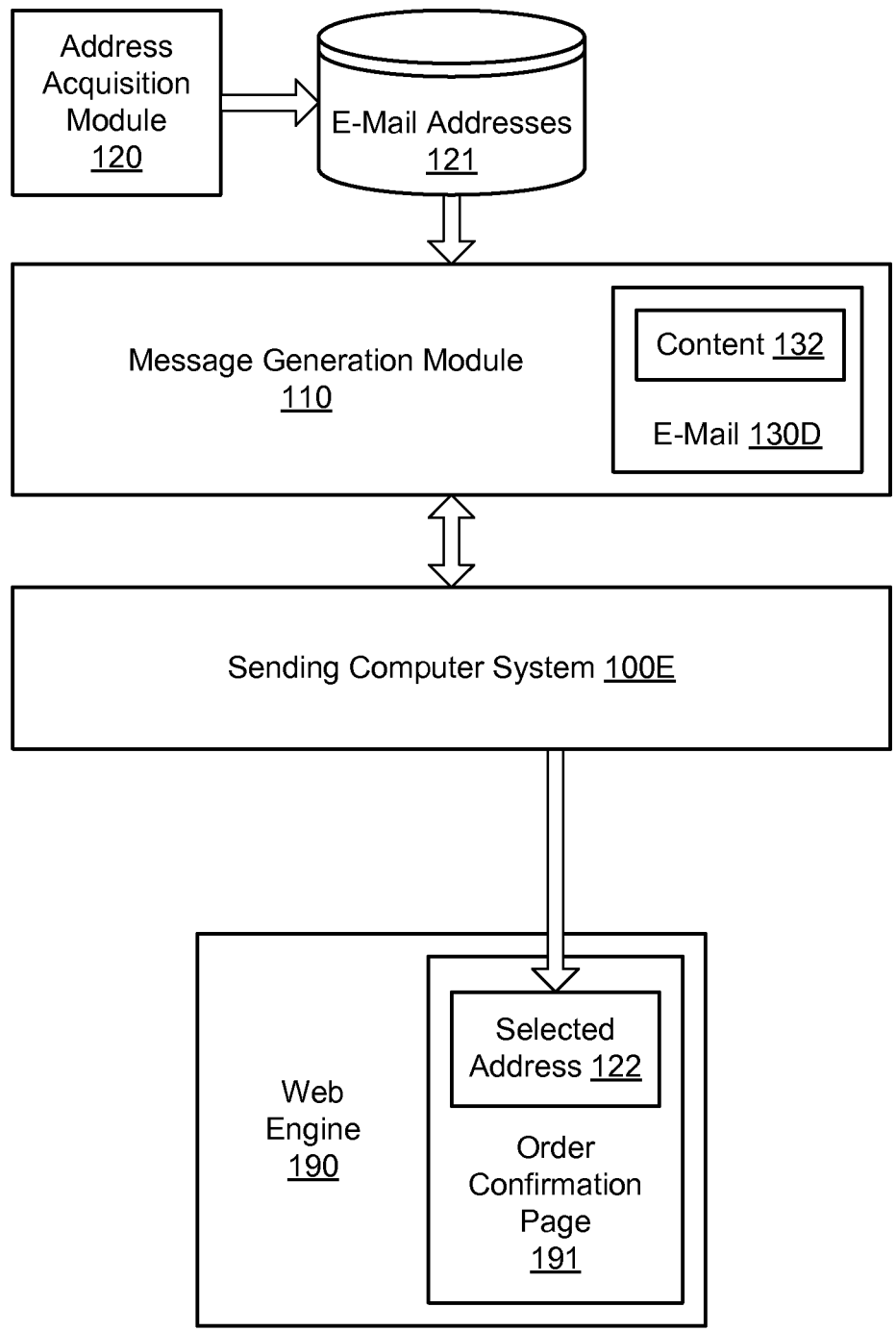
FIG. 10 illustrates an example system environment for sending an e-mail and providing an order confirmation page, according to one embodiment.

FIG. 10 illustrates an example system environment for sending an e-mail and providing an order confirmation page, according to one embodiment. A customer of an online merchant may place an order or otherwise participate in a transaction with the online merchant. In response to the order or transaction, using any of the methods and systems described above (e.g., with respect to FIGS. 1-9), an e-mail 130D may be successfully delivered by a sending computer system 100E to a customer e-mail address 122. The message content (i.e., body) 132 of the e-mail 130D may comprise an order confirmation, an order receipt, an order invoice, or any other appropriate message involving a transaction between an online merchant and a customer. The header of the e-mail 130D may comprise the e-mail address 122 selected according to any of the methods and systems described herein.

The sending computer system 100E may provide the identity of the selected e-mail address 122 and an indication of successful delivery of the e-mail to a web engine module 190. Using the information provided by the sending computer system 100E, the web engine 190 may generate an order confirmation page 191. The web engine 190 may use any suitable technique for generating a web page and for providing the order confirmation page to a web browser of the customer. The order confirmation page may include an indication of the selected e-mail address 122 to inform the customer that the order confirmation or other transactional message was sent to the selected e-mail address.

In one embodiment, the identity of the selected e-mail address 122 may also be provided to the web engine 190 to produce an order history page or order status page. The identity of the selected e-mail address 122 may be stored with a record of the order or transaction that prompted the e-mail 130D. When the customer desires to access the order history or order status at any point, the web engine 190 may obtain or retrieve the selected e-mail address 122 associated with the record of the order or transaction to inform the customer that the order confirmation or other transactional message was sent to the selected e-mail address. The web engine 190 may use any suitable technique for generating a web page and for providing the order status page or order history page to a web browser of the customer.

As shown in FIG. 10, when the customer places an order via the merchant's website, the merchant's website may provide an order confirmation page 191 to the customer's web browser. Using the systems and methods described herein, the identity of the e-mail address to which the message was successfully delivered may be determined and then included in order confirmation page. The web engine 190 may wait to obtain the e-mail address 122 for up to a pre-determined amount of time before providing the order confirmation page 191 to the customer. However, the merchant's web engine 190 may not wait beyond the pre-determined amount of time (e.g., five seconds) to obtain the identity of the e-mail address 122. For example, the address may not be selected or the e-mail may not be successfully delivered within the pre-determined amount of time. If the identity of the e-mail address 122 is not obtained within the pre-determined amount of time, then the order confirmation page 191 may be provided to the customer without the identity of the e-mail address 122. However, the e-mail address may be specified on an order status or order history page that the customer may check at a later time.

Third-Party E-Mail Services

In one embodiment, any of the e-mail sending or scheduling methods and systems described herein may be provided to third parties by an entity that maintains any of the sending computer systems 100A, 100B, 100C, 100D, or 100E. The deliverability-based e-mail sending service and/or the round-robin e-mail service may be made available as a service to a third party e-mail sender that seeks to reach e-mail recipients in a reliable manner. For example, Amazon Simple E-Mail Service (available from Amazon.com or Amazon Web Services LLC) may include options for its clients to use the deliverability-based e-mail sending techniques and/or the round-robin e-mail techniques. Using SMTP or simple API calls, a client of a service such as Amazon Simple E-Mail Service may access an e-mail infrastructure to efficiently communicate to the client's customers using the systems and methods described herein. The client of the e-mail service may maintain or control various components shown in FIGS. 1-4 and FIGS. 6-7, including the address acquisition module 120, e-mail address storage 121, and/or message generation module 110.

In one embodiment, the client of the e-mail service may supply information that is used to identify or order the plurality of recipient e-mail addresses. For example, the service provider (e.g., via the sending computer system 110A, 100B, 110C, 100D, and/or 100E) may acquire the plurality of e-mail addresses 121 from the client through a suitable API call. As another example, the client may provide a priority or ranking of the e-mail addresses, such as a designation of one of the addresses as a primary address. In one embodiment, the client of the e-mail service may supply elements of the delivery likelihood data 176 to the sending computer system. For example, the client may provide an indication that previous e-mails to one of the e-mail addresses have been flagged as spam by the user or recipient host. As another example, the client may provide information based on engagement metrics to indicate the potential deliverability of each e-mail address. The deliverability data may be provided via a suitable API call.

Illustrative Computer System

Figure 11:
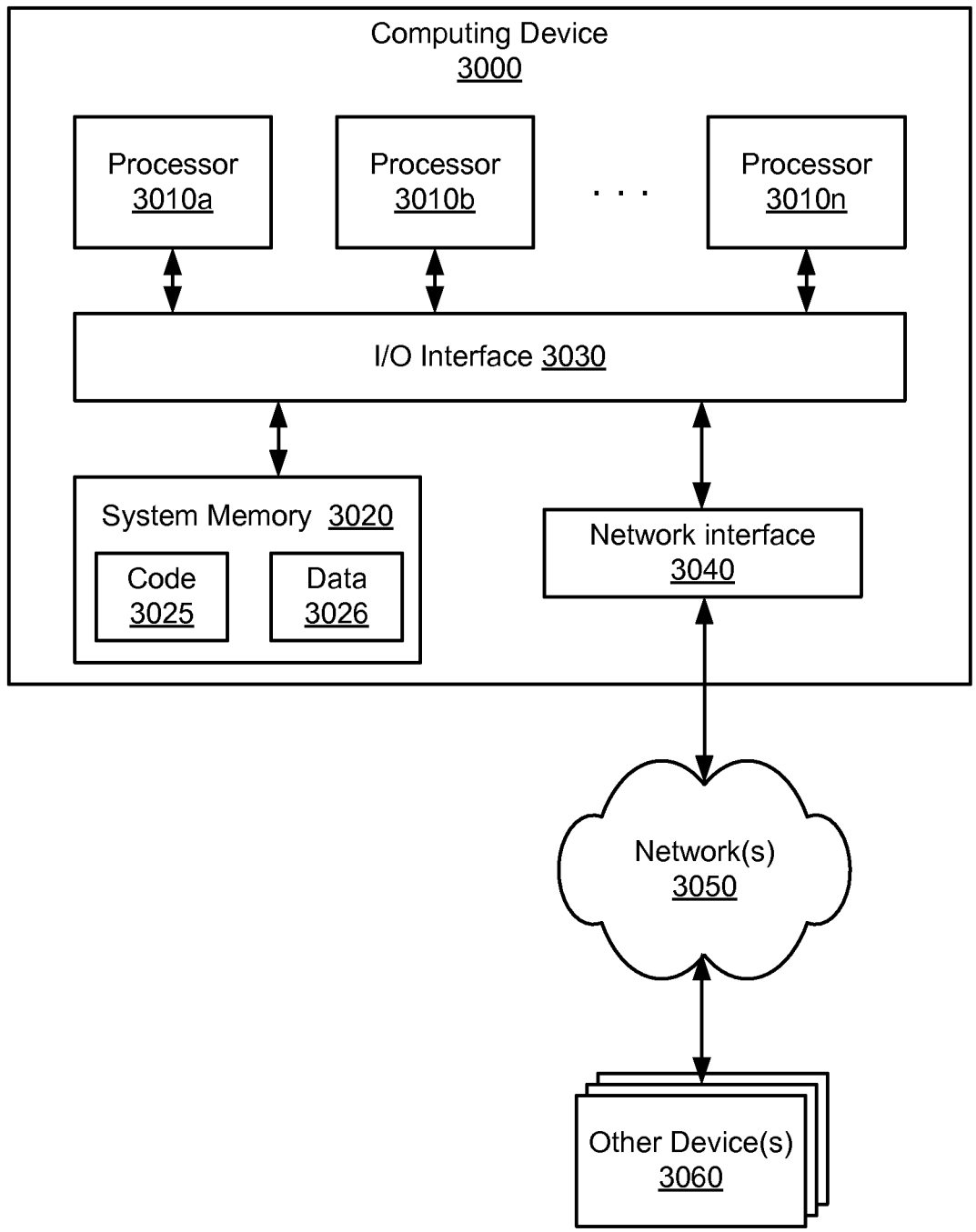
FIG. 11 illustrates an example computing device that may be used in some embodiments.

In at least some embodiments, a computer system that implements a portion or all of one or more of the technologies described herein, including the techniques to implement the functionality of sending computer systems 100A, 100B, 100C, 100D, and/or 100E, may include a general-purpose computer system that includes or is configured to access one or more computer-readable media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 10, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 10 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

CONCLUSION

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computers configured to implement a deliverability-based e-mail system, wherein the deliverability-based e-mail system comprises:
an address acquisition module configured to acquire and store a plurality of e-mail addresses for a user;
a message generation module configured to generate a message content for an e-mail designated to be sent to the user; and
a sending computer system comprising a sending mail transport agent (MTA), wherein the sending computer system is configured to:
initiate a plurality of connections between the sending MTA and respective receiving MTAs for the plurality of the e-mail addresses for the user;
for respective e-mail addresses of the plurality of e-mail addresses for the user, obtain data indicative of a likelihood of e-mail delivery to the respective e-mail address after said initiate the plurality of connections between the sending MTA and the respective receiving MTAs, wherein the connections are initiated and the data indicative of the likelihood of e-mail delivery are obtained without sending e-mail including the generated message content via the connections;
select, based at least in part on the data indicative of a likelihood of e-mail delivery, one of the plurality of e-mail addresses having the highest likelihood of e-mail delivery;
for one or more of the respective e-mail addresses of the e-mail addresses other than the selected e-mail address, and based at least in part on said select one of the plurality of e-mail addresses, close the respective connection between the sending MTA and the respective receiving MTA such that the respective connection is closed without having been used to send e-mail including the generated message content; and
send an e-mail comprising the message content to the selected e-mail address.

2. The system as recited in claim 1, wherein the data indicative of the likelihood of e-mail delivery comprises a response time to an RCPT command sent from the sending MTA to the respective receiving MTA.

3. The system as recited in claim 1, wherein the data indicative of the likelihood of e-mail delivery comprises a reply code to an RCPT command sent from the sending MTA to the respective receiving MTA.

4. The system as recited in claim 1, wherein the data indicative of the likelihood of e-mail delivery comprises a success or a failure of the opening the connection between the sending MTA and the respective receiving MTA.

5. The system as recited in claim 1, wherein the message content comprises an order confirmation for an order placed by the user, and wherein the deliverability-based e-mail system further comprises:
a web engine module configured to generate an order confirmation page comprising an indication that the e-mail was sent to the selected e-mail address.

6. A computer-implemented method, comprising:
acquiring a plurality of e-mail addresses of a user for an e-mail designated to be sent to the user;
for the plurality of the e-mail addresses for the user:
initiating connections between a sending computer system and a respective receiving computer system; and
determining, after said initiation, respective data indicative of a likelihood of e-mail delivery to the respective e-mail address for the plurality of the e-mail addresses for the user;
wherein the connections are initiated and the data indicative of a likelihood of e-mail delivery are obtained based at least in part on initiating the connections without sending e-mail including the generated message content via the connections;
automatically selecting, based at least in part on the data indicative of a likelihood of e-mail delivery, one of the plurality of e-mail addresses;
for one or more of the respective e-mail addresses of the e-mail addresses other than the selected e-mail address, and based at least in part on said selecting one of the plurality of e-mail addresses, closing the respective e-mail connection between the sending computer system and the respective receiving computer system such that the respective connection is closed without having been used for sending the e-mail including the generated message content; and
sending the e-mail from the sending computer system to the selected e-mail address.

7. The method as recited in claim 6, wherein acquiring the plurality of e-mail addresses for the e-mail to be sent comprises receiving the plurality of e-mail addresses from a client of an e-mail service through an Application Programming Interface (API).

8. The method as recited in claim 6, wherein the deliverability information comprises a likelihood of successful e-mail delivery for the respective e-mail address.

9. The method as recited in claim 6, wherein the deliverability information is based on a response time to an RCPT command sent from the sending computer system to the respective receiving computer system.

10. The method as recited in claim 6, wherein the deliverability information is based on a reply code to an RCPT command sent from the sending computer system to the respective receiving computer system.

11. The method as recited in claim 6, wherein the deliverability information is based on a success or a failure of the opening the e-mail connection between the sending computer system and the respective receiving computer system.

12. The method as recited in claim 6, wherein the deliverability information for each e-mail address is based a quality of the e-mail connection between the sending computer system and the respective receiving computer system.

13. The method as recited in claim 6, further comprising:
generating an order confirmation page comprising an indication that the e-mail was sent to the selected e-mail address.

14. A non-transitory computer-readable storage medium storing program instructions computer-executable to perform:
retrieving a plurality of e-mail addresses for a user from a storage device;
for the plurality of e-mail addresses for the user:
initiating connections between a sending computer system and a respective receiving computer system; and
determining a likelihood of successful e-mail delivery for the respective connections between the sending computer system and the respective receiving computer systems, wherein the likelihood of successful e-mail delivery is determined based at least in part on data indicative of the likelihoods of successful e-mail delivery from initiating the connections;
wherein the connections are initiated and the likelihoods of successful e-mail delivery are determined without sending e-mail including the generated message content via the connections;
automatically selecting one of the connections based at least in part on the determined likelihoods of successful e-mail delivery;
for at least one of the connections other than the selected connection, and based at least in part on said selecting one of the connections, closing the connection between the sending computer system and the respective receiving computer system such that the respective connection is closes without having been used for sending an e-mail including the generated message content using the connection; and
sending the e-mail using the selected connection.

15. The non-transitory computer-readable storage medium as recited in claim 14, wherein the likelihood of successful e-mail delivery for each of the connections is based on data received from a client of an e-mail service.

16. The non-transitory computer-readable storage medium as recited in claim 14, wherein the likelihood of successful e-mail delivery is determined based on a response time to an RCPT command sent from the sending computer system to the respective receiving computer system.

17. The non-transitory computer-readable storage medium as recited in claim 14, wherein the likelihood of successful e-mail delivery is determined based on a reply code to an RCPT command sent from the sending computer system to the respective receiving computer system.

18. The non-transitory computer-readable storage medium as recited in claim 14, wherein the likelihood of successful e-mail delivery is determined based on a success or a failure of the opening the connection between the sending computer system and the respective receiving computer system.

19. The non-transitory computer-readable storage medium as recited in claim 14, wherein the likelihood of successful e-mail delivery is determined based on a quality of the e-mail connection between the sending computer system and the respective receiving computer system.

20. The non-transitory computer-readable storage medium as recited in claim 14, wherein the program instructions are further computer-executable to perform:
generating an order confirmation page comprising an indication that the e-mail was sent to the e-mail address corresponding to the selected connection.

21. A system, comprising:
at least one processor; and
a memory coupled to the at least one processor, wherein the memory stores program instructions, wherein the program instructions are executable by the at least one processor to:
retrieve a plurality of e-mail addresses of a user for an e-mail designated to be sent to the user;
for the plurality of e-mail addresses of the user:
initiate e-mail connections with respective receiving computer systems; and
determine a likelihood of successful e-mail delivery for respective e-mail connections with the respective receiving computer systems, wherein the likelihood of successful e-mail delivery is determined based at least in part on data indicative of the likelihoods of successful e-mail delivery from initiating the connections;
wherein the connections are initiated and the likelihoods of successful e-mail delivery are determined without sending e-mail including the generated message content via the connections;
automatically select, based at least in part on the likelihoods of successful e-mail delivery, one of the plurality of e-mail addresses corresponding to the e-mail connection having a highest likelihood of successful e-mail delivery;

for one or more of the respective e-mail connections of the e-mail connections other than the e-mail connection having the highest likelihood of successful e-mail delivery, and based at least in part on said select one of the plurality of e-mail addresses, close the respective e-mail connection such that the respective e-mail connection is closed without having been used for sending the e-mail; and send the e-mail to the selected e-mail address.

22. The system as recited in claim 21, wherein the program instructions are executable by the at least one processor to:

select a source IP address from which to send the e-mail.

23. The system as recited in claim 21, wherein the likelihood of successful e-mail delivery is determined based on a response time to an RCPT command sent to the respective receiving computer system.

24. The system as recited in claim 21, wherein the likelihood of successful e-mail delivery is determined based on a reply code to an RCPT command sent to the respective receiving computer system.

25. The system as recited in claim 21, wherein the likelihood of successful e-mail delivery is determined based on a success or a failure of the opening of the e-mail connection with the respective receiving computer system.

26. The system as recited in claim 21, wherein the likelihood of successful e-mail delivery is determined based on a quality of the e-mail connection between the sending computer system and the respective receiving computer system.

27. The system as recited in claim 21, wherein the program instructions are executable by the at least one processor to:

generate an order confirmation page comprising an indication that the e-mail was sent to the selected e-mail address.

\* \* \* \* \*